United States Patent
George et al.

(10) Patent No.: US 9,294,526 B2
(45) Date of Patent: Mar. 22, 2016

(54) MANAGING MULTIPLE DYNAMIC MEDIA STREAMS

(75) Inventors: Sam J. George, Kenmore, WA (US);
Shane C. Guillet, Seattle, WA (US);
Sudheer Sirivara, Redmond, WA (US);
Vishal Sood, Bothell, WA (US); Jack E. Freelander, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 12/647,564

(22) Filed: Dec. 28, 2009

(65) Prior Publication Data

US 2011/0161485 A1    Jun. 30, 2011

(51) Int. Cl.
| G06F 15/173 | (2006.01) |
| G06F 15/16 | (2006.01) |
| H04L 29/06 | (2006.01) |

(52) U.S. Cl.
CPC .......... *H04L 65/4069* (2013.01); *H04L 65/80* (2013.01)

(58) Field of Classification Search
USPC ......... 709/224, 229, 231, 246, 247, 201, 202, 709/203, 208, 209, 210, 211, 232, 233, 709/248; 725/115, 116, 40; 370/241, 252, 370/253, 352, 353, 395.2, 395.21, 395.4, 370/395.41, 395.42, 395.43, 461, 464, 468; 718/104; 712/220, 225
See application file for complete search history.

(56) References Cited

U.S. PATENT DOCUMENTS

| | | | |
|---|---|---|---|
| 6,067,576 A * | 5/2000 | Berranger et al. ............ 719/321 |
| 6,085,252 A * | 7/2000 | Zhu et al. ...................... 709/231 |
| 6,516,002 B1 * | 2/2003 | Huang et al. .................. 370/468 |
| 6,570,888 B1 * | 5/2003 | Huang et al. .................. 370/468 |
| 6,574,218 B1 * | 6/2003 | Cooklev ........................ 370/352 |
| 6,603,739 B1 | 8/2003 | Dubuc |
| 6,727,915 B2 | 4/2004 | Coleman et al. |
| 6,795,854 B1 * | 9/2004 | Parker et al. .................. 709/223 |
| 7,009,997 B2 * | 3/2006 | Huang et al. .................. 370/468 |
| 7,010,598 B2 | 3/2006 | Sitaraman et al. |
| 7,020,093 B2 * | 3/2006 | Sirivara et al. ............... 370/252 |
| 7,096,271 B1 | 8/2006 | Omoigui et al. |
| 7,257,814 B1 * | 8/2007 | Melvin et al. ................. 718/104 |
| 7,339,893 B2 * | 3/2008 | Regal et al. .................... 370/235 |

(Continued)

OTHER PUBLICATIONS

Huang, et al., "Optimal Control of Multiple Bit Rates for Streaming Media", Retrieved at <<http://nisl.wayne.edu/Papers/Tech/HuangCK04c.pdf>> Dec. 2004, pp. 4.

*Primary Examiner* — Saket K Daftuar
(74) *Attorney, Agent, or Firm* — Kevin Sullivan; Kate Drakos; Micky Minhas

(57) ABSTRACT

A coordinated adaptive streaming system provides a level of intelligence between adaptive streaming heuristics applied to multiple multi-bitrate streams playing on a client computer at the same time. The system receives a media event that includes multiple multi-bitrate streams and plays two or more of the streams. Each stream registers with the coordinated adaptive streaming system so that the system is aware of each of the streams. The system receives a priority indication from each stream that indicates the priority of the stream relative to other streams associated with the media event. The system uses the received priority indications to make adaptive streaming decisions. Thus, the coordinated adaptive streaming system provides playback that more closely aligns with a user's priorities and provides a higher quality experience to a user viewing multiple concurrent media streams.

20 Claims, 4 Drawing Sheets

(56) References Cited

U.S. PATENT DOCUMENTS

| | | | |
|---|---|---|---|
| 7,440,761 B2* | 10/2008 | Matsukura et al. | 455/452.2 |
| 7,480,701 B2 | 1/2009 | Smith et al. | |
| 7,650,605 B2* | 1/2010 | Melvin et al. | 718/104 |
| 7,773,581 B2* | 8/2010 | Punj et al. | 370/352 |
| 7,953,882 B2* | 5/2011 | Shukla et al. | 709/231 |
| 2001/0010682 A1* | 8/2001 | Schoenblum et al. | 370/232 |
| 2001/0022789 A1* | 9/2001 | Huang et al. | 370/468 |
| 2005/0237931 A1* | 10/2005 | Punj et al. | 370/229 |
| 2006/0059223 A1 | 3/2006 | Klemets et al. | |
| 2006/0184670 A1* | 8/2006 | Beeson et al. | 709/224 |
| 2006/0288397 A1* | 12/2006 | Uchida et al. | 725/115 |
| 2007/0024706 A1* | 2/2007 | Brannon et al. | 348/142 |
| 2007/0053446 A1* | 3/2007 | Spilo | 375/259 |
| 2007/0121678 A1* | 5/2007 | Brooks et al. | 370/505 |
| 2008/0008439 A1* | 1/2008 | Liu et al. | 386/46 |
| 2008/0052414 A1 | 2/2008 | Panigrahi et al. | |
| 2008/0103615 A1* | 5/2008 | Walsh et al. | 700/94 |
| 2008/0137587 A1* | 6/2008 | Matsukura et al. | 370/315 |
| 2008/0145023 A1* | 6/2008 | Candelore et al. | 386/84 |
| 2009/0031038 A1* | 1/2009 | Shukla et al. | 709/231 |
| 2009/0043906 A1* | 2/2009 | Hurst et al. | 709/231 |
| 2009/0097413 A1* | 4/2009 | Todd et al. | 370/253 |
| 2009/0144792 A1* | 6/2009 | Fielibert et al. | 725/116 |
| 2009/0154487 A1* | 6/2009 | Ryan et al. | 370/445 |
| 2009/0199190 A1* | 8/2009 | Chen et al. | 718/102 |
| 2009/0201988 A1 | 8/2009 | Gazier et al. | |
| 2009/0232114 A1* | 9/2009 | Barave et al. | 370/338 |
| 2009/0285217 A1* | 11/2009 | Frink et al. | 370/394 |
| 2009/0313484 A1* | 12/2009 | Millet et al. | 713/300 |
| 2010/0042235 A1* | 2/2010 | Basso et al. | 700/94 |
| 2010/0106838 A1* | 4/2010 | Segev et al. | 709/226 |
| 2010/0158101 A1* | 6/2010 | Wu et al. | 375/240.01 |
| 2010/0161825 A1* | 6/2010 | Ronca et al. | 709/231 |
| 2010/0269102 A1* | 10/2010 | Latorre et al. | 717/130 |
| 2011/0066673 A1* | 3/2011 | Outlaw | 709/203 |

* cited by examiner

MANAGING MULTIPLE DYNAMIC MEDIA STREAMS

BACKGROUND

Streaming media is multimedia that is constantly received by, and normally presented to, an end-user (using a client) while it is being delivered by a streaming provider (using a server), and is contrasted with simply downloading a complete media file from a server to a client and playing the media file back after the download is complete. Several protocols exist for streaming media, including the Real-time Streaming Protocol (RTSP), Real-time Transport Protocol (RTP), and the Real-time Transport Control Protocol (RTCP), which are often used together. The Real Time Streaming Protocol (RTSP), developed by the Internet Engineering Task Force (IETF) and created in 1998 as Request For Comments (RFC) 2326, is a protocol for use in streaming media systems, which allows a client to remotely control a streaming media server, issuing VCR-like commands such as "play" and "pause", and allowing time-based access to files on a server. RTP is usually used in conjunction with RTCP. While RTP carries the media streams (e.g., audio and video) or out-of-band signaling (dual-tone multi-frequency (DTMF)), RTCP is used to monitor transmission statistics and quality of service (QoS) information. RTCP gathers statistics on a media connection and information such as bytes sent, packets sent, lost packets, jitter, feedback, and round trip delay. An application may use this information to increase the quality of service, perhaps by limiting flow or using a different codec or bit rate.

Streaming media is often accessed through a web browser. Contemporary browsers and other applications allow plug-ins, which in general comprise hosted software code that interacts with the hosting browser/application to provide additional functionality. One reason for using plug-ins is to increase security, because the hosting browser limits the actions that the hosted code (which is generally untrusted) can perform. The Internet has become very dangerous, with malicious websites often attempting to cause a user to download and run harmful code that may damage the user's computer system or destroy the user's data. Thus, web browsers often include restrictions on the code that can run, and the plug-ins that are allowed to perform actions on the user's computer system. Plug-ins increase the size of the sandbox provided by the browser, because they allow more functionality on the web while decreasing the number of untrusted applications installed. One such plug-in is Microsoft® Silverlight™, which provides a platform that allows application developers to create rich web applications hosted in the browser that typically include animation, vector graphics, and/or media (e.g., audio/video) content playback. Newer web applications may make use of feature-rich web plug-ins like Microsoft Silverlight to build rich applications that are nearly or more functional than their desktop counterparts.

Bandwidth is often a concern when streaming media over the web for access in a web browser or other client application as is reducing cost with caching. To reduce bandwidth, streaming media may be encoded and packaged in various format designed to reduce bandwidth. One such format is multi-bitrate encoding. Multi-bitrate encoding is a method of encoding a particular media presentation at multiple bitrates (e.g., 300 kbps and 600 kbps) at a server and allowing a client (or server) to choose an appropriate bitrate for the client. For example, a client with a fast, high bandwidth connection will likely select the highest bitrate available to deliver the highest quality picture on the client, while a client with a slow, low bandwidth connection will likely select a lower bitrate that the client can receive fast enough for streaming to avoid glitches. Sometimes automatic methods are used (at the client or server) to dynamically tune the bitrate received by a particular client, sometimes referred to as adaptive streaming. In addition to the client's connection, other activities of the client may act to limit the resources available for receiving streaming media, and adaptive streaming may take into account various factors to select a suitable bitrate for the client at a given time. With adaptive streaming, the bitrate requested by the client can change at any time during the presentation, adapting to suit current conditions.

Although adaptive streaming and multi-bitrate streams work well for a single streaming media presentation between a server and client, problems arise when a client accesses multiple multi-bitrate presentations (or streams) and performs adaptive streaming on the presentations at the same time. There are many reasons a client may want to access multiple streams. For example, the client may be watching multiple camera angles of a single live event, or the client may be viewing supplementary information related to a main presentation (e.g., historical footage related to what a speaker in another presentation is talking about). As an example of the problems that arise, imagine that a client computer's resources begin to become constrained (the particular resource is irrelevant, though it could be CPU, network bandwidth, graphical processing resources, and so forth), so that the client is having difficulty playing all of the existing media presentations at the currently selected bitrates. If all of the streams switch to a lower bitrate, the client will receive lower quality across all of the streams, which may be an overcorrection based on the actual scope of the resource shortage. In worse cases, one stream may overtake another that is more relevant to the user (e.g., a picture-in-picture stream overtaking the main picture stream). As one stream consumes more resources based on that stream's adaptive streaming decisions, other streams may back off to avoid exceeding the available resources. This may be undesirable, particularly where one presentation is higher priority to a user of the client computer than another presentation.

SUMMARY

A coordinated adaptive streaming system is described herein that provides a level of intelligence between adaptive streaming heuristics applied to multiple multi-bitrate streams playing on a client computer at the same time. The system receives a media event that includes multiple multi-bitrate streams and plays two or more of the streams. Each stream registers with the coordinated adaptive streaming system so that the system is aware of related streams playing at the same time on the client computer. The system receives a priority indication from each stream that indicates the priority of the stream relative to other streams associated with the media event. The system uses the received priority indications to make adaptive streaming decisions. Thus, the coordinated adaptive streaming system provides playback that more closely aligns with a user's priorities and provides a higher quality experience to a user viewing multiple concurrent media streams.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A coordinated adaptive streaming system is described herein that provides a level of intelligence between adaptive streaming heuristics applied to multiple multi-bitrate streams playing on a client computer at the same time. The system receives a media event in the form of a media stream that includes multiple multi-bitrate streams. For example, a user may access a web page for watching football that includes streams for various camera angles of an ongoing game. The system plays (e.g., begins streaming) two or more of the streams. For example, the web page may include controls for selecting a main stream that is displayed larger than other streams and for selecting particular available streams to display in association with a main stream (e.g., picture-in-picture streams). Each stream registers with the coordinated adaptive streaming system so that the system is aware of related streams (e.g., multiple multi-bitrate streams within a single plug-in) playing at the same time on the client computer. For example, streams embedded in a web page may include application code (e.g., Microsoft Silverlight instructions) that invokes an application-programming interface (API) provided by the system for registering each stream with the system.

The system receives a priority indication from each stream that indicates the priority of the stream relative to other streams associated with the media event. For example, a picture-in-picture stream may provide a lower priority indication than a main media presentation stream. The system uses the received priority indications to make adaptive streaming decisions and recommendations (e.g., to allow an application developer to act on hints provided by the system). For example, if client resources become over utilized, the system may begin halting playback of lower priority streams or may scale back a selected bitrate of lower priority streams to maintain the overall resource usage associated with the event within the constraints of the client resources. Thus, the coordinated adaptive streaming system provides playback that more closely aligns with a user's priorities and provides a higher quality experience to a user viewing multiple concurrent media streams.

The coordinated adaptive streaming system monitors network and playback performance of each media stream and recommends enabling or disabling each stream in a cascading fashion based on priority. At startup and periods of expanding client resources, if the first stream is capable of playing back media at an acceptable performance level, the system will enable (or recommend through a notification that a hosted application enable) the second stream and so on. Conversely, in periods of contracting client resources, if any of the enabled streams cannot maintain an acceptable performance level, the coordinated adaptive streaming system will recommend disabling that stream and all lower priority media streams.

Figure 1:
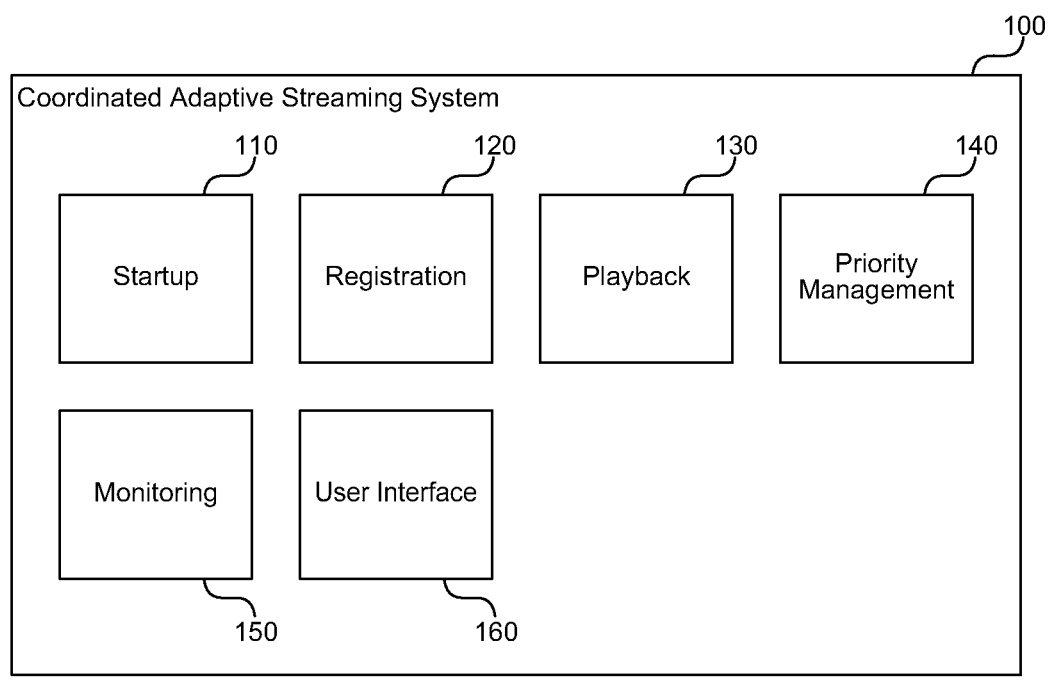
FIG. 1 is a block diagram that illustrates components of the coordinated adaptive streaming system, in one embodiment.

FIG. 1 is a block diagram that illustrates components of the coordinated adaptive streaming system, in one embodiment. The system 100 includes a startup component 110, a registration component 120, a playback component 130, a priority management component 140, a monitoring component 150, and a user interface component 160. Each of these components is described in further detail herein.

The startup component 110 receives information describing one or more multi-bitrate media streams and initializes each stream for playback. For example, the component 110 may be invoked by a web browser when a user visits a web page with embedded media streams or when a user runs a particular client application that accesses streamed media. The component 110 may receive a uniform resource locator (URL) that identifies the streaming server and path for accessing each media stream. The startup component 110 invokes the registration component 120 to register each stream, then starts each stream and invokes the playback component 130 to play the streams on the client hardware. As described further herein, the startup component 110 may start streams one by one, allowing each stream to complete starting before starting the next stream to more effectively utilize bandwidth and allow a smoother startup experience.

The registration component 120 receives a registration indication for each stream that provides information for monitoring the playback of the stream. The component 120 may receive priority information that indicates the relative priority of streams. For example, a web application for displaying multiple camera angles of a media event, each as its own stream, may assign a higher priority to a selected camera angle than to other camera angles playing in the background. The registration component 120 sets up data structures for managing the list of streams and their priorities during playback. The component 120 may provide these data structures to other components, such as the priority management component 140 and monitoring component 150 to perform tasks after the streams are playing.

The playback component 130 manages playback of streams. The component 130 may invoke APIs for interacting with hardware resources, such as speakers or a display, to provide playback of the media streams. The component 130 also manages ongoing downloading of each media stream to prepare the next section of each stream for playback. The system may invoke an external infrastructure for playing back media, such as the Smooth Streaming Media Element and Microsoft Silverlight. The playback component 130 may also receive indications to start or stop playback of a particular stream from the monitoring component 150 to carry out the coordinated adjustment of bitrates described herein.

The priority management component 140 maintains priority information associated with each stream. For example, the component 140 may receive the information from the registration component 120 when a stream starts up, and may receive changes to the information during playback. The user may select various streams through the user interface component 160 in a way that affects each stream's priority. For example, a user may select a stream to be played as a larger main stream, relegating other streams to smaller background views on a display. This action may cause the larger stream to be given a higher priority than the other streams. The priority management component 140 tracks the priority of each stream and provides priority information about streams to the monitoring component 150 for adapting stream bitrates dynamically as described herein.

The monitoring component 150 monitors the playback of multiple media streams and acts to adapt playback of streams in response to one or more resource conditions. The component 150 may run at periodic intervals and traverse a list of streams to determine whether each stream is playing back at a threshold acceptable bitrate. If all streams are playing acceptably and there are disabled streams, the monitoring component 150 may re-enable one or more disabled stream to attempt to add more streams to the playback. Conversely, if one or more streams are struggling to playback at the threshold acceptable bitrate, then the monitoring component 150 may disable the lowest priority stream that is playing back to attempt to direct more client resources to the higher priority streams. The monitoring component 150 may override adaptive mechanisms associated with each stream, or provide hints through raised notifications that allow each stream to act in coordination with other streams. Unlike previous systems, this prevents the adaptive mechanisms of the streams from exhibiting undesirable effects when acting at the same time without coordination.

The user interface component 160 receives input from a user and provides output by playing back the media streams. The component 160 may provide one or more controls for the user to interact with streams, including typical playback controls (such as play/pause/stop), as well as controls for selection which streams are active and how streams are prioritized relative to one another. For example, a user may select a stream to be a main presentation and another stream to be a picture-in-picture overlaid in a small window over the main presentation. The system 100 uses the user's input to affect stream bitrate adaptation decisions according to the monitoring described herein. The system may invoke an external infrastructure for providing the user interface, such as Microsoft Silverlight.

The computing device on which the coordinated adaptive streaming system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
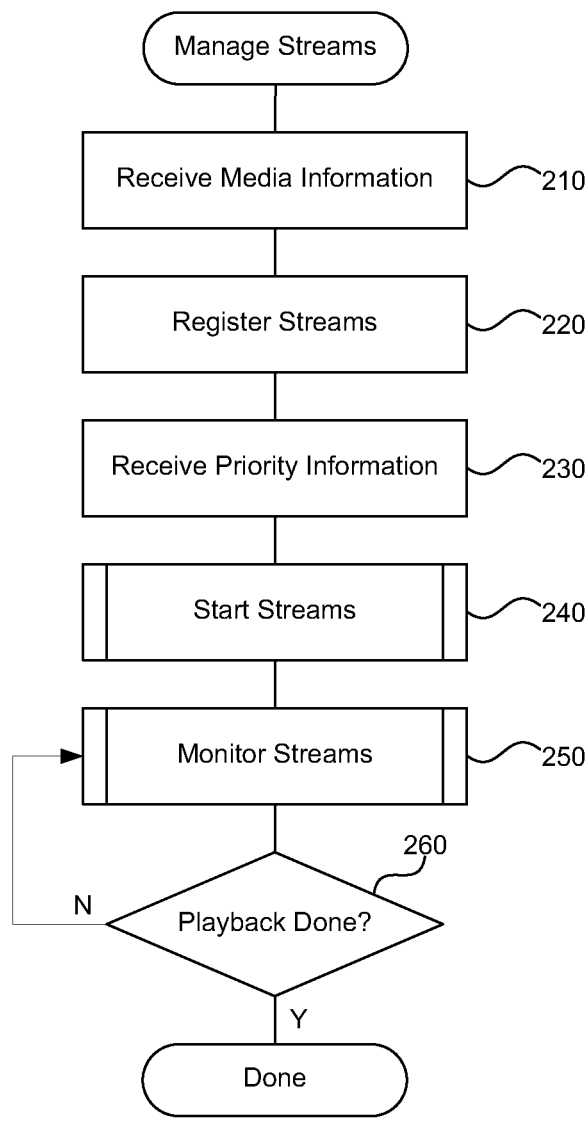
FIG. 2 is a flow diagram that illustrates processing of the system to manage multiple multi-bitrate streams, in one embodiment.

FIG. 2 is a flow diagram that illustrates processing of the system to manage multiple multi-bitrate streams, in one embodiment. Beginning in block 210, the system receives media information that describes multiple multi-bitrate streams. For example, a user may access a web page for watching football that includes streams for various camera angles of an ongoing game. Accessing the web page may invoke a browser plug-in, such as Microsoft Silverlight, or a managed application using the plug-in to execute a hosted application that provides the media information. In some embodiments, the application may download a manifest that describes the media event from a server. The manifest may include information about available streams and each stream's priority.

Continuing in block 220, the system registers each stream so that the system is aware of each of the streams playing at the same time on a client computer. For example, streams embedded in a web page may include application code (e.g., Microsoft Silverlight instructions or a managed application built using Microsoft Silverlight or other frameworks) that invokes an application-programming interface (API) for registering each stream with the system. The application may subscribe to a programmatic event raised by the system (e.g., RecommendationChanged) for each stream to receive notification when the system recommends enabling, disabling, or varying the bitrate of the stream. Continuing in block 230, the system receives a priority indication from each stream that indicates the priority of the stream relative to other streams associated with a media event. For example, a picture-in-picture stream may provide a lower priority indication than a main media presentation stream. Continuing in block 240, the system starts the streams described by the received media information. For example, the system may start the streams one by one as described further herein according to the relative priority between the streams, so that the system allows higher priority streams earliest access to the client's resources.

Continuing in block 250, the system monitors the multiple streams to ensure that the streams coordinate to adapt to changing client resource conditions. For example, if the system detects over utilized client resources, the system may provide a notification to a lower priority stream to disable playback so that higher priority streams can use the resources currently consumed by the lower priority stream. Accordingly, the system uses the received priority indications to make adaptive streaming decisions. Continuing in decision block 260, the system determines whether playback of the streams is complete. For example, the media event may end at a particular time or after a certain duration. If playback is complete, then the system completes, else the system loops to block 250 to continue monitoring the streams. After block 260, these steps conclude.

Figure 3:
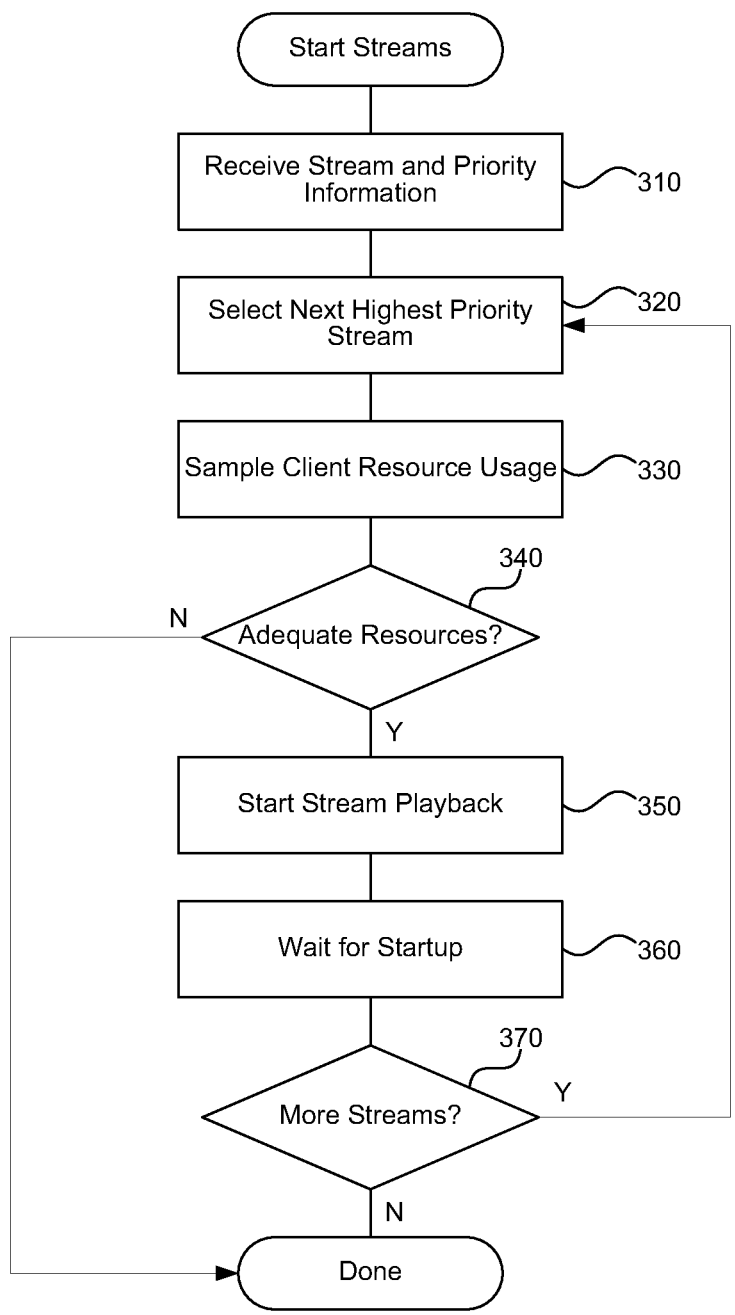
FIG. 3 is a flow diagram that illustrates processing of the startup component to start multiple streams for playback, in one embodiment.

FIG. 3 is a flow diagram that illustrates processing of the startup component to start multiple streams for playback, in one embodiment. Beginning in block 310, the component receives information about multiple streams and their relative priorities for playback. For example, the startup component may receive a list from the registration component of the streams that are part of an event. The information may include an indication that one stream is a main part of the presentation, and other streams are lower priority. Continuing in block 320, the startup component selects a stream with a highest indicated priority to start first. For example, the component may store a list of streams ordered by priority, and traverse the list in priority order to start streams for playback. Continuing in block 330, the component samples client resource usage to determine whether there are adequate client resources to playback the selected stream at a threshold acceptable quality level. For example, the stream may specify a 64 kbps floor threshold for stream playback, and the component may determine whether there is adequate bandwidth and client processing power to playback the stream at that bitrate. Alternatively, for the first stream, the component may simply start the stream without determining available resources. If the first stream cannot play then no streams will be able to play and the user may wish to abandon viewing the presentation.

Continuing in decision block 340, if the component determines that there are adequate client resources to playback the selected stream, then the component continues at block 350, else the component completes without starting further streams. Note that this may mean that the component does not start one or more lower priority streams because there are insufficient resources, which has the positive effect of providing a good experience for the streams that the component did start. Continuing in block 350, the component starts playback of the selected stream. For example, the startup may invoke the playback component to begin downloading sections of the stream and providing them to the user via output hardware (e.g., speakers or a display).

Continuing in block 360, the component optionally delays for a period to allow the stream sufficient time to start up and reach a steady state of playback (and corresponding resource consumption). This smoothes out any abnormal high resource consumption produced during stream startup and allows the sampling of resources for the next stream to receive a more accurate indication of the ability of the client system to handle playback of additional streams. Continuing in decision block 370, if there are more streams, then the component loops to block 320 to select and start the next highest priority stream, else the component completes. As shown in FIG. 2, the system may perform monitoring repeatedly, such as at a specified interval. After block 370, these steps conclude.

Figure 4:
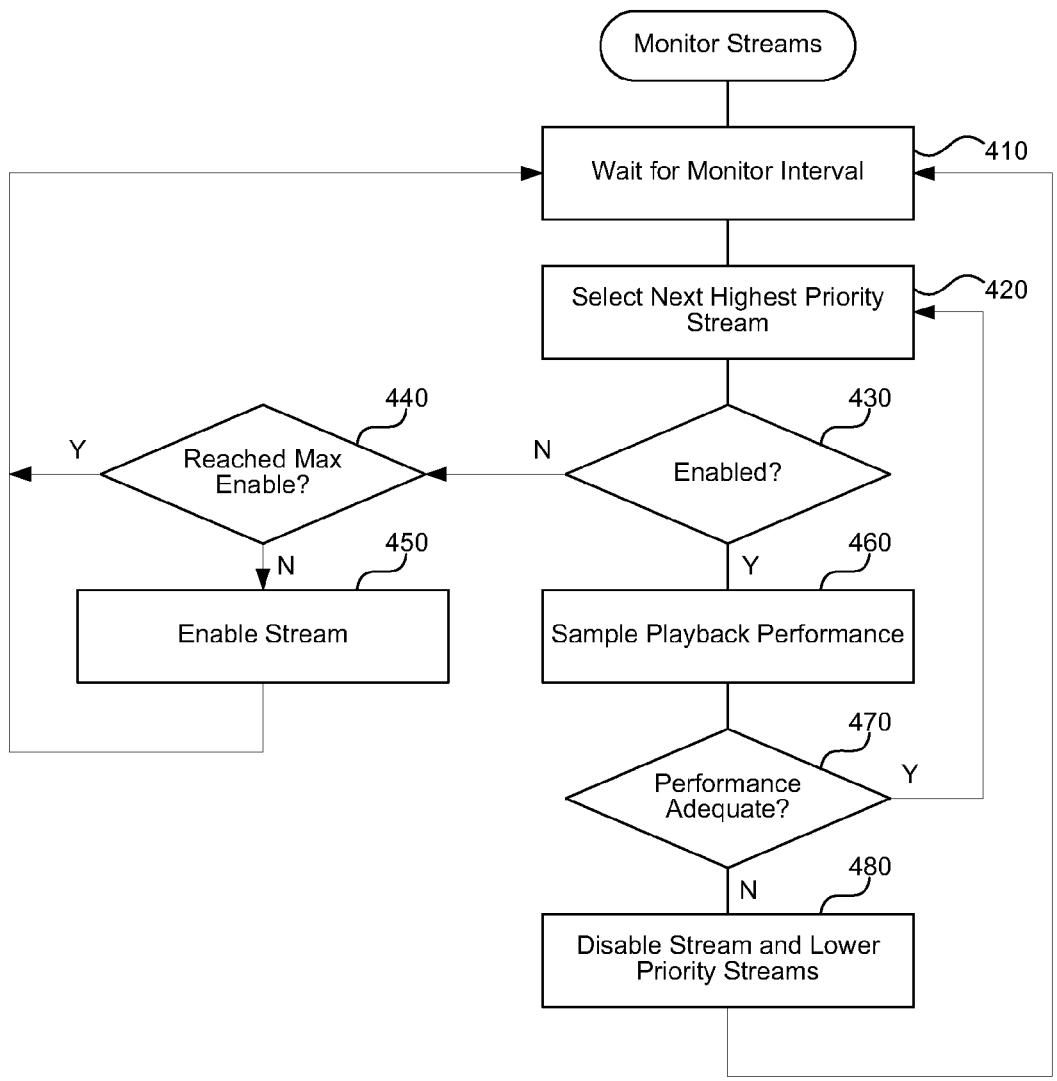
FIG. 4 is a flow diagram that illustrates processing of the monitor component to manage playback of multiple streams, in one embodiment.

FIG. 4 is a flow diagram that illustrates processing of the monitor component to manage playback of multiple streams, in one embodiment. Beginning in block 410, the component waits a specified period for a monitoring interval to transpire. Waiting a certain amount of time (e.g., one second) between enabling and disabling the streams allows time for performance statistics to gather, avoids rapid turning on and off of the streams, and avoids consuming client resources with excessive monitoring. Rather, after the streams have played for a while, the system will check how the streams are performing and make any adjustments needed. Continuing in block 420, the component selects the highest priority stream (or next highest priority stream in the case of subsequent loop iterations). For example, the system may traverse a priority ordered list of streams that are related to the same media presentation.

Continuing in decision block 430, the component determines whether the selected stream is already enabled. If the stream is already enabled, then the component continues at block 460, else the component continues at block 440. Continuing in decision block 440, if the selected stream has reached a threshold of re-enable attempts, then the component loops to block 410 to wait for the next monitor interval, else the system continues at block 450. Continuing in block 450, the component enables the selected stream, then loops to block 410 to wait for the next monitor interval. In some embodiments, the system may instead loop to block 420 to continue enabling more than one stream. However, enabling a single stream per monitoring interval can be used to avoid altering the load on client resources too much in one interval, and allows time to build up statistics to ensure the attempt to start one additional stream was successful before starting additional streams. In some embodiments, the system does not actually enable and disable media streams itself, but rather provides an indication to a hosted application (e.g., through a programmatic notification) recommending that the application take that action.

Continuing in block 460, the component samples the playback performance of the selected stream. For example, the component may access performance statistics tracked by a media API or other source that indicate whether the stream has adequate client resources to perform at the selected level. For example, the statistics may include information about dropped packets, average achieved bitrate, and so forth. Continuing in decision block 470, if the sampled performance meets a predetermined performance threshold, then the component loops to block 420 to select the next highest priority stream, else the component continues at block 480. Continuing in block 480, the component disables the selected stream and any lower priority streams. If the stream has not been performing adequately then it is likely that the stream is at the threshold of the client's available resources and may be consuming resources needed by higher priority streams. By disabling the streams in an orderly manner by priority, the system avoids all of the streams adapting to limited resources at the same time and provides a good experience for higher priority streams.

After block 480, the component loops to block 410 to wait for the next monitor interval and repeat the process again. As described further herein, in some embodiments the system may attempt to always leave the highest priority stream enabled. This results in some media always playing for the user for the duration of the presentation. Accordingly, during the above processing, when disabling streams, the component may leave the highest priority stream enabled and disable lower priority streams. The measurement of acceptable performance may be configurable, so that an administrator, user, or application developer can determine a level of performance at which additional streams can start. For example, the system may start additional streams when the following conditions are met: 1) the system is downloading the current stream at a threshold bitrate, 2) the system is playing back the current stream at the threshold bitrate (e.g., 600 kbps), and 3) the system is playing back the current stream at a threshold frame rate (e.g., 22 fps). Those of ordinary skill in the art will recognize various criteria common in the art for assessing multimedia performance.

In some embodiments, the coordinated adaptive streaming system is implemented in a browser plug-in, such as Microsoft Silverlight. Silverlight supports multi-bitrate media playback using the Silverlight MediaElement and MediaStreamSource objects. When an application is using a single multi-bitrate MediaElement, the MediaElement responds to changes in networking and machine capabilities to continuously provide the highest quality bitrate that the client can receive. When multiple multi-bitrate MediaElements are being used by an application (for example, for Picture-In-Picture (PIP)) the system described herein can be used to provide a higher level of heuristics to monitor resources across all multi-bitrate MediaElements and recommend turning them on and off in an orderly fashion in response to networking and machine capabilities. In some embodiments, the system uses an enhanced version (e.g., a derived class) of the MediaElement, such as the Smooth Streaming Media Element built on Microsoft Silverlight. The enhanced version may use the MediaStreamSource object as one of several stream types that can be used with the system.

In some embodiments, the coordinated adaptive streaming system starts media streams one at a time. Sometimes streaming media incurs a heavier cost at startup than when at steady state during playback. In addition, the system can more effectively measure the effect on client resources of starting each media stream, if the system starts the streams one at a time. Accordingly, the system may "slow start" the streams by enabling the highest priority stream, sampling network conditions, and (if there are sufficient resources) enabling the next priority stream, and so on. The system continues through the group of streams in this manner until the system either has enabled the lowest priority stream or has exhausted the client's resources allocated to media playback and cannot start further streams.

In some embodiments, the coordinated adaptive streaming system sets a threshold number of times that a particular stream can be re-enabled after having been disabled due to lack of available resources. It may be undesirable to turn particular streams off and on repeatedly, as the user experience is poor when the user can only barely get the chance to view a particular stream (because it is going in and out so much). Thus, if the system determines that it has not been able to play a particular stream regularly, as indicated by keeping the stream enabled, then the system may simply mark the stream as not eligible for further restarts. During times of expanding client resources, as the system traverses the list of streams looking for streams to start it will skip over any marked in this way (and potentially any lower priority than marked streams as well). The system may allow an administrator or user to configure the threshold number of times that the system re-enables a stream before the stream is marked to be skipped. Alternatively or additionally, the system may not try for an extended period of time and then later try again, with the delay time configurable.

In some embodiments, the coordinated adaptive streaming system evaluates streams for restarting or disabling at a regular interval. For example, the system may establish a monitor interval and perform the steps described herein to traverse a list of streams at each monitor interval. The system may then re-enable eligible streams one at a time as described herein to allow each to reach a steady state before starting the next. By waiting for a regular interval, the system can produce behavior that is more predictable and avoid rapidly starting and stopping streams before enough time has passed to allow resource conditions to change. In some embodiments, the system may react more quickly to disable streams than to restart them, so that resource constriction is solved quickly but resource expansion is not relied upon until it is sufficiently stable.

In some embodiments, the coordinated adaptive streaming system may maintain a separate low and high water mark for determining when to enable or disable streams. As described above, the low and high water mark are the same. However, the system may allow a gap between the two. For example, a particular stream may set a low threshold of 300 kbps and a high threshold of 600 kbps. When the stream falls below the low threshold the system disables the stream. When the stream is above the low threshold, the system does not start additional streams until the stream reaches the high threshold. This allows an application author to enforce a particular level of quality in one stream before playing lower priority streams.

In some embodiments, the coordinated adaptive streaming system processes a shared audio channel. Because each stream is adaptively changing, the system may receive and playback a shared audio channel applicable to all of the streams to avoid glitch audio when streams are enabled and disabled. The system may provide the audio channel even when bandwidth or other resources are insufficient to play video for any of the streams. The shared audio channel can also provide synchronization between the streams.

In some embodiments, the coordinated adaptive streaming system may receive changes to stream priority or coordination handling from a server or hosted applications. For example, a content provider may provide an in-stream command through the server to stop monitoring lower priority streams when an advertisement is playing as the highest priority stream. The application may also provide signals that alter the system behavior, such as when the user fast-forwards or performs other actions.

From the foregoing, it will be appreciated that specific embodiments of the coordinated adaptive streaming system have been described herein for purposes of illustration, but that various modifications may be made without deviating from the spirit and scope of the invention. Accordingly, the invention is not limited except as by the appended claims.

We claim:

1. A computer-implemented method for monitoring multiple dynamic media streams playing concurrently on a client computer system having a processor, the method comprising:
   receiving, by the processor, media information that describes multiple multi-bitrate streams available from a network, wherein each of the multi-bitrate streams is encoded at multiple bitrates and carries content from a media source different than media sources associated with the other multi-bitrate streams;
   receiving, by the processor, a priority indication for each of the multi-bitrate streams, the priority indication indicates a priority of one of the multi-bitrate streams relative to other multi-bitrate streams;
   receiving, by the processor, from the network at least two of the multi-bitrate streams described by the received media information and performing concurrent playback of the at least two multi-bitrate streams in the client computer system;
   monitoring, by the processor, the at least two multi-bitrate streams during playback; and
   upon detecting over utilization of client resources in the client computer system during playback of the at least two multi-bitrate streams, reducing, by the processor, a bitrate of playback of one of the multi-bitrate streams with a lower priority to a lower bitrate value so that at least one multi-bitrate stream with a higher priority can use at least some of the client resources concurrently consumed by the multi-bitrate stream with the lower priority.

2. The method of claim 1 wherein receiving, with the processor, media information comprises accessing, with the processor, a webpage that contains an embedded multiple stream video presentation.

3. The method of claim 1 wherein receiving, with the processor, media information comprises receiving, with the processor, a manifest that includes a list of multi-bitrate streams and an indication of each multi-bitrate stream's playback priority.

4. The method of claim 1 wherein monitoring, with the processor, the at least two multi-bitrate streams comprises waiting, with the processor, a specified monitor interval between sampling the at least two multi-bitrate streams to adapt to changing client resource conditions.

5. The method of claim 1 wherein monitoring, with the processor, the at least two multi-bitrate streams comprises, upon detecting that a selected multi-bitrate stream is not currently enabled, determining, with the processor, whether the selected multi-bitrate stream has been re-enabled a threshold number of times before attempting to re-enable the selected multi-bitrate stream.

6. The method of claim 1 wherein monitoring, with the processor, the at least two multi-bitrate streams comprises after enabling a disabled stream, waiting, with the processor, a specified monitor interval before starting additional multi-bitrate streams.

7. The method of claim 1 wherein monitoring, with the processor, the at least two multi-bitrate streams comprises sampling, with the processor, playback performance of one of the at least two multi-bitrate streams to determine whether playback of the one of the at least two multi-bitrate streams satisfies a specified threshold bitrate.

8. The method of claim 1 wherein monitoring, with the processor, the at least two multi-bitrate streams comprises sampling, with the processor, playback performance of one of the at least two multi-bitrate streams to determine whether playback of the one of the at least two multi-bitrate streams satisfies a specified threshold frame rate.

9. The method of claim 1 wherein monitoring, with the processor, the at least two multi-bitrate streams comprises, upon determining that one of the at least two multi-bitrate streams is enabled and playing back at a threshold level, selecting, with the processor, another one of the at least two multi-bitrate streams with a lower priority and determining whether to enable the selected another one of the at least two multi-bitrate streams.

10. The method of claim 1 wherein reducing, by the processor, a bitrate of playback of one of the multi-bitrate streams with a lower priority comprises disabling, by the processor, playback of one or more multi-bitrate streams that are lower in priority than the multi-bitrate stream with the lower priority.

11. The method of claim 1 wherein the priority indication for each of the multi-bitrate streams includes a disable stream threshold bitrate and an enable stream threshold bitrate.

12. A computing system for coordinating bitrate adjustments of multiple dynamic media streams, the computing system comprising:
    a processor and a memory operatively coupled to the processor, the memory containing instructions executable by a processor to cause the processor to perform a process comprising:
    receiving information describing two or more media streams, wherein each of the media streams is encoded at multiple bitrates and carries content from a media source different than media sources associated with content of the other media streams;
    receiving a registration indication for each of the two or more media streams, wherein the registration indication includes priority information that indicates a relative priority of each of the media streams;
    initializing each of the two or more media streams for concurrent playback; and
    monitoring the concurrent playback of the two or more media streams and reducing a bitrate of playback of at least one of the media streams with a lower relative priority to a lower bitrate value in response to one or more resource conditions that change during the concurrent playback of the two more media streams.

13. The computing system of claim 12 wherein initializing each media stream for concurrent playback includes starting, by the processor, the media streams one at a time and allowing each stream to complete startup before starting a next stream.

14. The computing system of claim 12 wherein the process performed by the processor further includes receiving, by the processor, dynamic changes to a priority of at least one stream while the streams are concurrently playing.

15. The computing system of claim 12 wherein monitoring the concurrent playback includes monitoring, by the processor, the concurrent playback at periodic intervals and traversing a list of the streams to determine whether each stream is playing back at a threshold acceptable bitrate.

16. The computing system of claim 12 wherein the process performed by the processor further includes:
    determining, by the processor, if currently playing streams are each playing at a threshold acceptable bitrate and if there are disabled streams; and
    in response to determining that the currently playing streams are playing at a threshold acceptable bitrate and there are disabled streams, enabling, by the processor, at least one of the disabled streams.

17. The computing system of claim 12 wherein the process performed by the processor further includes determining, by the processor, if currently playing streams are each playing at a threshold acceptable bitrate, and in response to determining that at least one currently playing streams is not playing at a threshold acceptable bitrate, disabling, by the processor, at least one of the currently playing streams.

18. The computing system of claim 12 the process performed by the processor further includes receiving, by the processor, input from a user that determines at least one priority for at least one stream.

19. A computer-readable storage device comprising instructions for controlling a computer system to startup multiple adaptive streams, wherein the instructions executable by a processor cause the processor to perform actions comprising:
    receiving information identifying first and second streams and associated relative priorities for playback of the first and second streams, wherein:
    each of the first and second streams is encoded at multiple bitrates;
    the first stream carries content from a first media source; and
    the second stream carries content from a second media source different than the first media source, the second stream having a priority lower than the first stream;
    receiving a selection of the first stream to begin playback;
    starting playback of the selected first stream;
    during playback of the first stream, sampling resource usage of the computer system to determine whether the selected first stream is playing back at a threshold quality level;
    upon determining that the first stream is playing back at the threshold quality level,
    starting playback of the second stream concurrently with playback of the first stream;
    monitoring the first and second streams during concurrent playback; and
    upon detecting over utilization of resources in the computer system during concurrent playback of the first and second streams, reducing a bitrate of playback of the second stream with the lower priority to a lower bitrate value so that the first stream uses at least some of the resources concurrently consumed by the second stream.

20. The computer-readable storage device of claim 19 wherein the actions performed by the processor further includes, after starting playback of the second stream, waiting, by the processor, for a predetermined period of time before repeating the sampling, selecting, and starting operations.

* * * * *